United States Patent
Kodama et al.

(10) Patent No.: US 10,482,926 B2
(45) Date of Patent: Nov. 19, 2019

(54) INFORMATION PROCESSING APPARATUS

(71) Applicant: FUJITSU LIMITED, Kawasaki-shi, Kanagawa (JP)

(72) Inventors: Hiroyoshi Kodama, Isehara (JP); Shigeto Suzuki, Kawasaki (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/680,534

(22) Filed: Aug. 18, 2017

(65) Prior Publication Data

US 2018/0137894 A1 May 17, 2018

(30) Foreign Application Priority Data

Nov. 15, 2016 (JP) .................. 2016-222266

(51) Int. Cl.
  *G06F 11/30* (2006.01)
  *H05K 7/14* (2006.01)
  (Continued)

(52) U.S. Cl.
  CPC ............ *G11B 33/02* (2013.01); *G06F 3/0607* (2013.01); *G06F 11/1092* (2013.01); (Continued)

(58) Field of Classification Search
  CPC ...... H05K 7/1489; H05K 10/00; G06F 1/184; G06F 21/50; G06F 11/1092; G06F 11/3058; G06F 11/3048; G06F 21/86; G06F 3/0607; G06F 11/3034; G06F 11/3485; G11B 33/02; G11B 33/128
  (Continued)

(56) References Cited

U.S. PATENT DOCUMENTS 3,932,716 A * 1/1976 Mottel ................ H01H 9/20
  200/50.02
4,125,305 A * 11/1978 Kasindorf ............ E05B 65/46
  312/233
(Continued)

FOREIGN PATENT DOCUMENTS

JP  09-508990   9/1997
JP  11-24803    1/1999
(Continued)

OTHER PUBLICATIONS

U.S. Office Action dated Apr. 1, 2019 for related U.S. Appl. No. 16/296,299, 13 pages.

*Primary Examiner* — Adrian S Wilson
(74) *Attorney, Agent, or Firm* — Fujitsu Patent Center

(57) ABSTRACT

An information processing apparatus includes: a casing which includes a side plate on each of left and right sides; and a processing apparatus to be mounted in the casing, wherein the processing apparatus includes: a board on which an arithmetic processing device and a storage device are mounted; a rail which is provided on each of the left and right sides of the board and extends in the horizontal direction to make the board slidable; a locking portion which locks the board to the casing; and a detection portion which detects that the board is taken out when the board is taken out from the casing by that locking by the locking portion is released and the board slides against the rails.

4 Claims, 14 Drawing Sheets

(51) Int. Cl.
 *H05K 10/00* (2006.01)
 *G11B 33/02* (2006.01)
 *G06F 11/10* (2006.01)
 *G06F 21/86* (2013.01)
 *G06F 3/06* (2006.01)
 *G11B 33/12* (2006.01)
 *G06F 11/34* (2006.01)

(52) U.S. Cl.
 CPC ...... *G06F 11/3048* (2013.01); *G06F 11/3058* (2013.01); *G06F 21/86* (2013.01); *G11B 33/128* (2013.01); *H05K 7/1485* (2013.01); *H05K 7/1489* (2013.01); *H05K 10/00* (2013.01); *G06F 11/3034* (2013.01); *G06F 11/3485* (2013.01)

(58) Field of Classification Search
 USPC .................................................. 361/724–728
 See application file for complete search history.

(56) References Cited

U.S. PATENT DOCUMENTS

| | | | |
|---|---|---|---|
| 5,371,749 A * | 12/1994 | Tsuda | G06F 11/004 361/725 |
| 5,483,419 A | 1/1996 | Kaczeus, Sr. et al. | |
| 5,586,250 A | 12/1996 | Carbonneau et al. | |
| 5,622,511 A | 1/1997 | Jarrett | |
| 5,761,033 A | 6/1998 | Wilhelm | |
| 5,835,700 A | 11/1998 | Carbonneau et al. | |
| 5,909,065 A * | 6/1999 | Jones | H02H 9/004 307/147 |
| 5,993,241 A | 11/1999 | Olson et al. | |
| 6,147,878 A | 11/2000 | Heselton | |
| 6,392,892 B1 | 5/2002 | Sobolewski et al. | |
| 6,667,887 B2 | 12/2003 | Sim et al. | |
| 6,754,082 B1 | 6/2004 | Ding et al. | |
| 6,853,552 B2 | 2/2005 | Brewer | |
| 7,133,291 B2 | 11/2006 | Carlson et al. | |
| 7,145,770 B1 | 12/2006 | Zimlin et al. | |
| 7,264,490 B1 | 9/2007 | Reznikov | |
| 7,327,564 B2 | 2/2008 | Carlson et al. | |
| 7,394,660 B2 | 7/2008 | Hidaka | |
| 2003/0002261 A1* | 1/2003 | Berry | H05K 7/1489 361/727 |
| 2004/0150973 A1* | 8/2004 | Junkins | H05K 7/1418 361/801 |
| 2006/0212747 A1 | 9/2006 | Okamoto et al. | |
| 2007/0047180 A1* | 3/2007 | Wirtzberger | H05K 7/1457 361/600 |
| 2018/0137894 A1 | 5/2018 | Kodama et al. | |

FOREIGN PATENT DOCUMENTS

| | | |
|---|---|---|
| JP | 2006-260236 | 9/2006 |
| JP | 2013-250732 | 12/2013 |
| WO | 2014/155654 | 10/2014 |

* cited by examiner

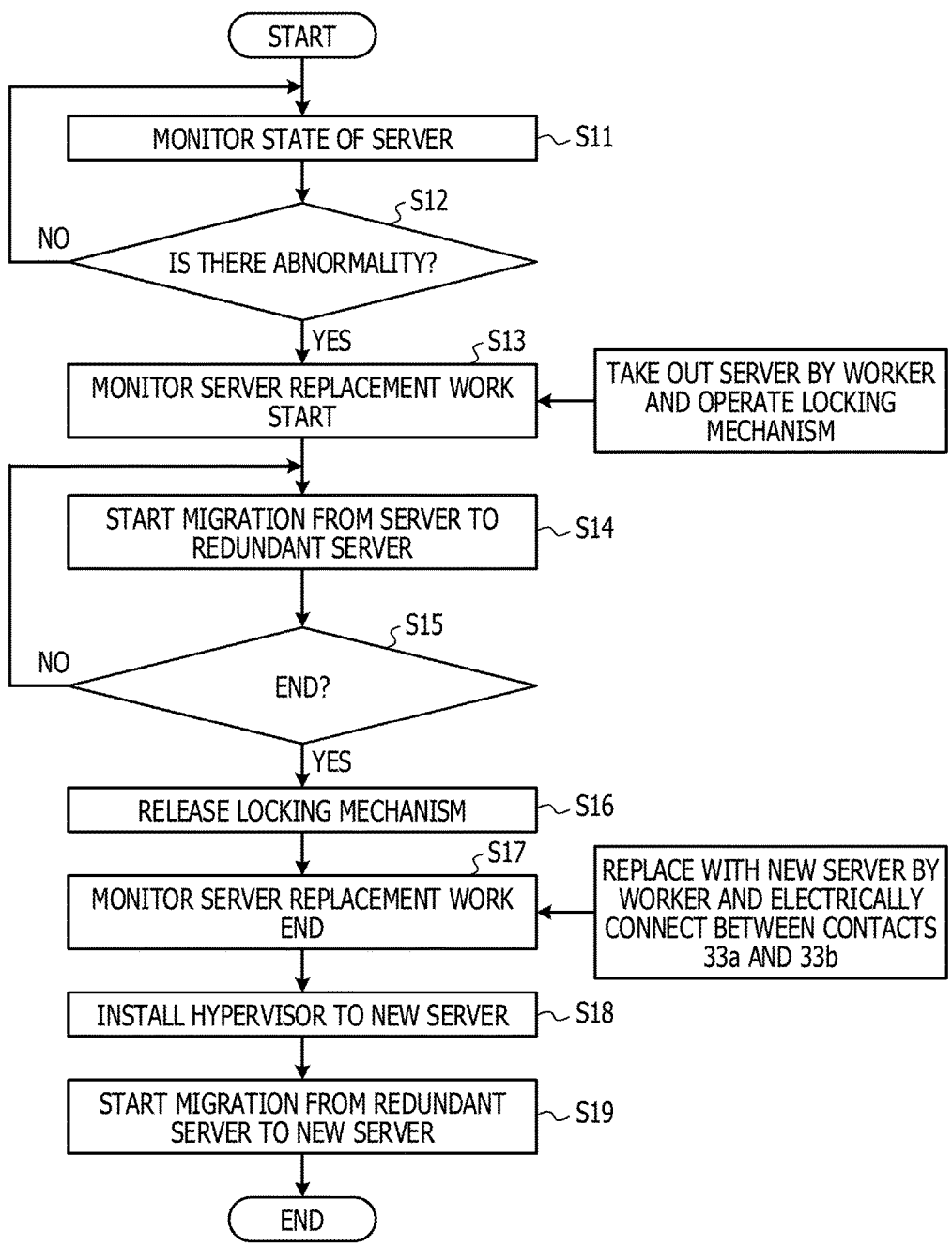

INFORMATION PROCESSING APPARATUS

CROSS-REFERENCE TO RELATED APPLICATION

This application is based upon and claims the benefit of priority of the prior Japanese Patent Application No. 2016-222266, filed on Nov. 15, 2016, the entire contents of which are incorporated herein by reference.

FIELD

The embodiment discussed herein is related to an information processing apparatus and a method for controlling an information processing apparatus.

BACKGROUND

With the advent of an advanced information society, a large amount of data is handled via a network.

Techniques related thereto are disclosed in the International Publication Pamphlet No. WO2014/155654, Japanese National Publication of International Patent Application No. 9-508990, Japanese Laid-open Patent Publication No. 2013-250732, Japanese Laid-open Patent Publication No. 2006-260236 or Japanese Laid-open Patent Publication No. 11-24803.

SUMMARY

According to an aspect of the embodiments, an information processing apparatus includes: a casing which includes a side plate on each of left and right sides; and a processing apparatus to be mounted in the casing, wherein the processing apparatus includes: a board on which an arithmetic processing device and a storage device are mounted; a rail which is provided on each of the left and right sides of the board and extends in the horizontal direction to make the board slidable; a locking portion which locks the board to the casing; and a detection portion which detects that the board is taken out when the board is taken out from the casing by that locking by the locking portion is released and the board slides against the rails.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates an example of an operation of the management device.

DESCRIPTION OF EMBODIMENTS

For example, in facilities such as a data center, a large number of servers are installed in the same room and are collectively managed. Tens of servers to thousands of servers are installed in one data center, and a management device monitors presence or absence of abnormality in those servers at all times.

A plurality of lamps which are referred to as status lamps are provided on a front panel of the server. For example, when abnormality occurs in a component such as a central processing unit (CPU), a memory, a power supply unit, and a fan, a corresponding lamp thereto is turned on.

For example, a large scale integrated circuit (LSI) chip which is referred to as a baseboard management controller (BMC) is mounted on the server. The BMC detects a state of the status lamp (turn on or turn off) and notifies the management device of the detection result via a communication cable, for example, a local area network (LAN) cable.

The server in which the abnormality is occurred is replaced with a normal server, but the program, data, an operating system (OS), or the like is transferred to another server (hereinafter referred to as "redundant server") so that the service is not blocked. A transfer work of the program, the data or the OS is referred to as migration and is performed using dedicated software. After server replacement is completed, migration is again performed from the redundant server to the server after replacement.

For example, a method for replacing a server in various data centers may be provided.

For example, when abnormality occurs in the server, not only the server may be replaced with a new server, but work such as migration may be performed. For example, the replacement of the server is performed by a maintenance engineer such as an experienced system engineer (SE) or an experienced customer engineer (CE). Accordingly, it takes a long time from when an observer (worker in data center) discovers the abnormality to when the observer calls the maintenance engineer and the maintenance engineer performs the replacement of the server and thus it may take a lot of labor cost to replace the server.

For example, an information processing apparatus and a method for controlling an information processing apparatus which facilitate replacement of a processing apparatus such as a server even if the maintenance engineer is not an experienced SE or CE may be provided.

Figure 1:
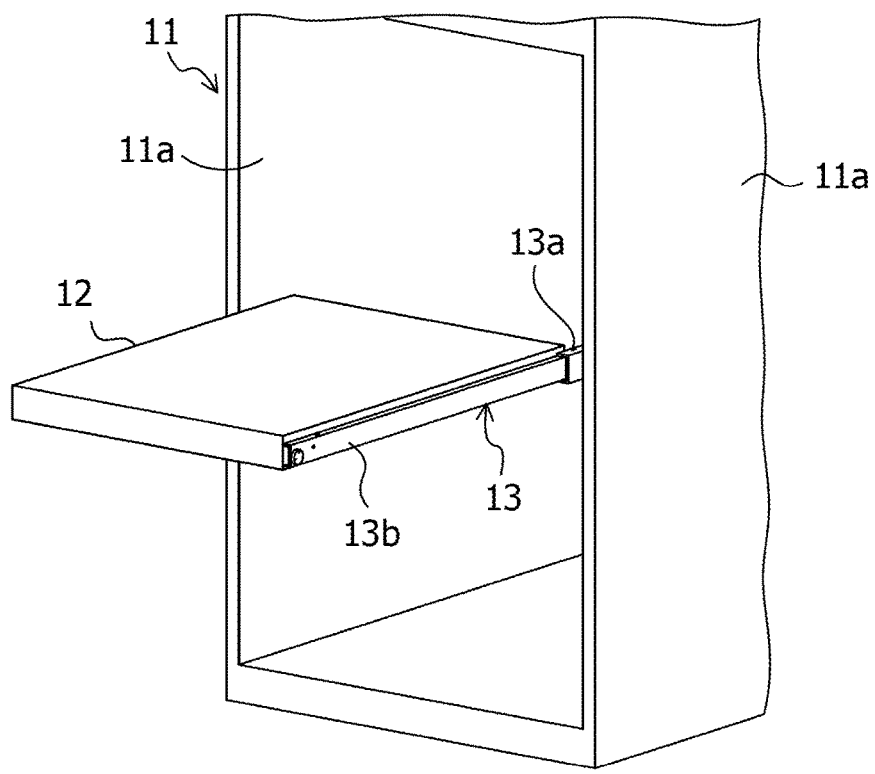
FIG. 1 illustrates an example of a server accommodated in a rack.

FIG. 1 illustrates an example of a server accommodated in a rack.

A large number of racks 11 are installed in the data center and a plurality of servers 12 (only one server is illustrated in FIG. 1) are accommodated in each rack 11. The rack 11 includes a side plate 11a on each of left and right sides. Each server 12 is supported by a support of the rack 11 via a pair of slide rails 13 extending in the horizontal direction. The rack 11 may be an example of a casing and the server 12 may be an example of a processing apparatus.

The slide rail 13 has an outer rail 13a fixed to the support of the rack 11 and an inner rail 13b sliding along the outer rail 13a. The server 12 is fixed to the inner rail 13b by screws or the like and the server 12 is easily taken out from the rack 11 when a work such as maintenance or replacement is performed.

Figure 2:
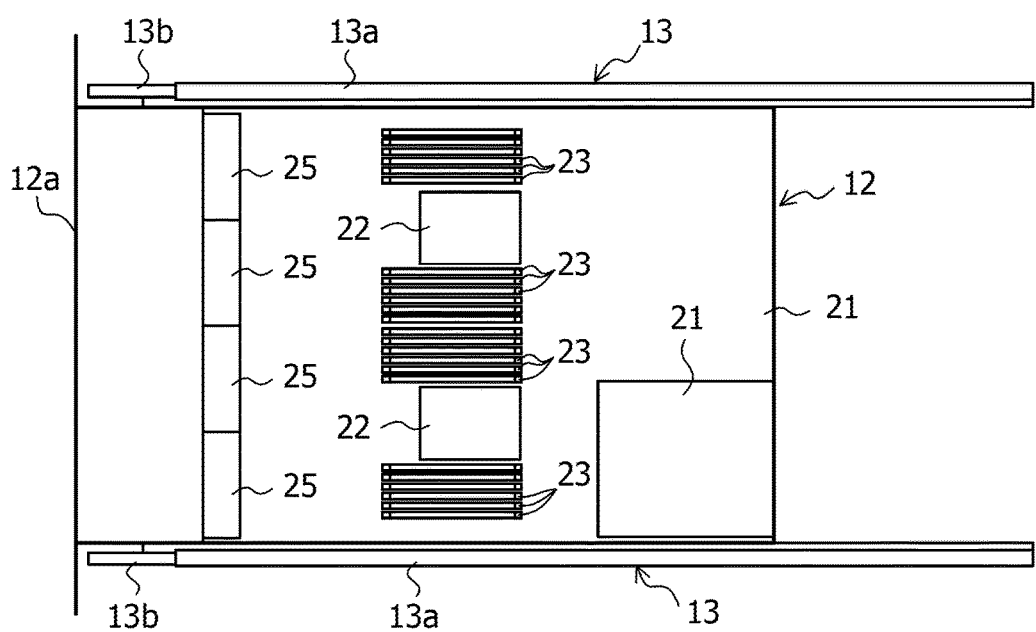
FIG. 2 illustrates an example of a top view of the server which is in a state of being supported on slide rails.
Figure 3:
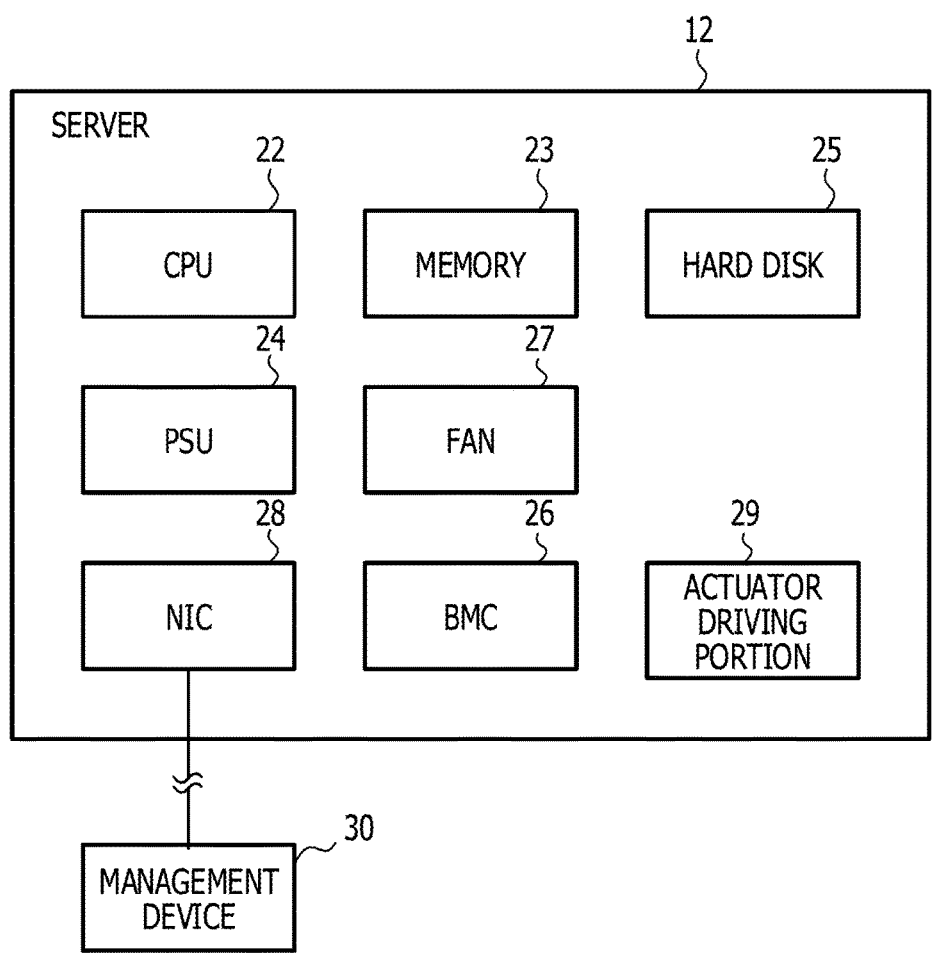
FIG. 3 illustrates an example of a configuration of the server.

FIG. 2 illustrates an example of a top view of the server which is in a state of being supported on the slide rail 13. FIG. 3 illustrates an example of a configuration of the server.

As illustrated in FIG. 2, the server 12 includes a wiring board 21 on which a CPU 22 and a memory 23 and the like are mounted, a power supply unit (PSU) 24, and a hard disk 25. A BMC 26 and an actuator driving portion 29 illustrated in FIG. 3 are also mounted on the wiring board 21. In addition to the wiring board 21, the power supply unit 24 and the hard disk 25, the server 12 has a fan (blower) 27 and a network interface card (NIC) 28. The CPU 22 may be an example of an arithmetic processing device and the memory 23 may be an example of a storage device.

The server 12 communicates with another server, the management device 30, or the like via a communication cable (LAN cable) connected to the NIC 28. For example, a specific server that operates by reading predetermined software such as data center management software of the servers installed in the data center may be a management device 30. For example, a dedicated computer prepared separately from the server may be the management device 30.

Figure 4:
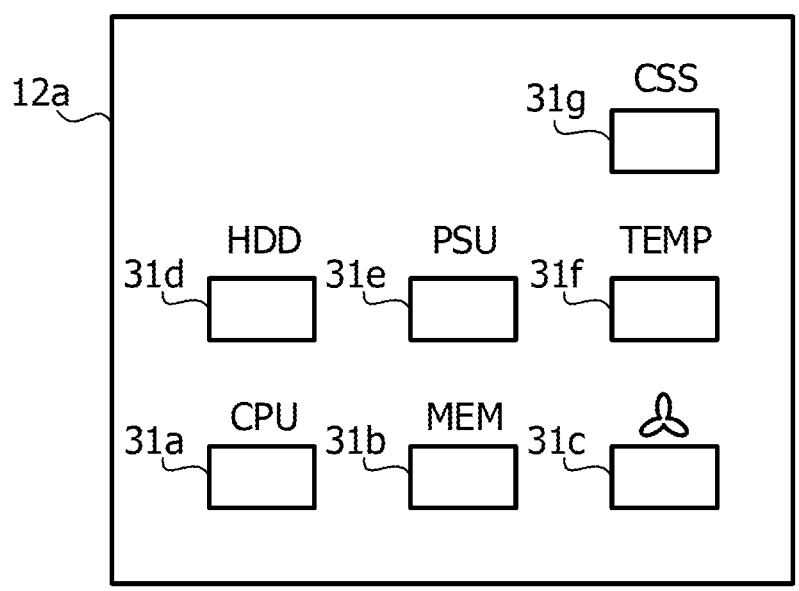
FIG. 4 illustrates an example of lamps provided on a front panel of the server.

A plurality of lamps (status lamps) are provided on a front panel 12a of the server 12. FIG. 4 illustrates an example of a lamp provided on the front panel of the server. The lamp may be a light-emitting diode (LED) lamp.

As illustrated in FIG. 4, a lamp 31a that indicates presence or absence of abnormality in the CPU 22, a lamp 31b that indicates presence or absence of abnormality in the memory 23, a lamp 31c that indicates presence or absence of abnormality in the fan 27, a lamp 31d that indicates presence or absence of abnormality in the hard disk 25, a lamp 31e that indicates presence or absence of abnormality in the power supply unit 24, a lamp 31f that indicates presence or absence of abnormality in a temperature, and a lamp 31g that indicates presence or absence of abnormality in the server 12 are provided on the front panel 12a of the server 12. For example, when there is abnormality in the hard disk 25, the lamp 31d and the lamp 31g are turned on. For example, when there is abnormality in the fan 27, the lamp 31c and the lamp 31g are turned on.

The BMC 26 collects information indicating a state (on or off) of the power supply of the server 12 and information indicating a state (turn on or turn off) of each of the lamps 31a to 31g and notifies the management device 30 of the information via the NIC 28.

Since the BMC 26 operates by firmware different from the OS of the server 12, even when the OS of the server 12 is down, the BMC 26 notifies the management device 30 of the information indicating a state of the lamps 31a to 31g. The management device 30 turns on and off the power supply of the server 12 via the BMC 26 and drives the actuator 35.

Figure 5:
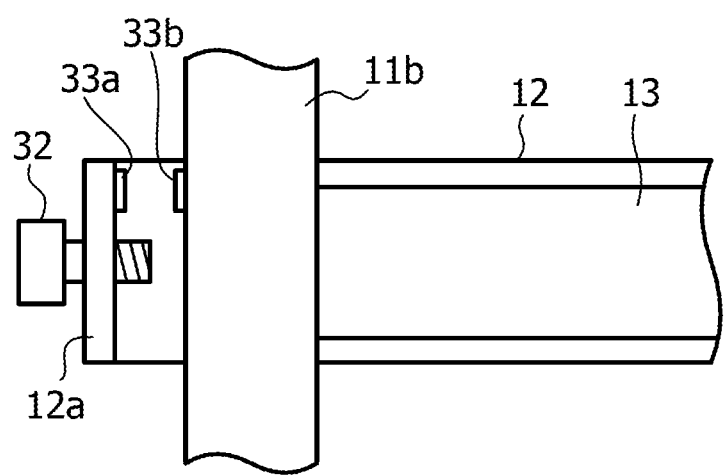
FIG. 5 illustrates an example of a replacement work start detection mechanism.
Figure 6:
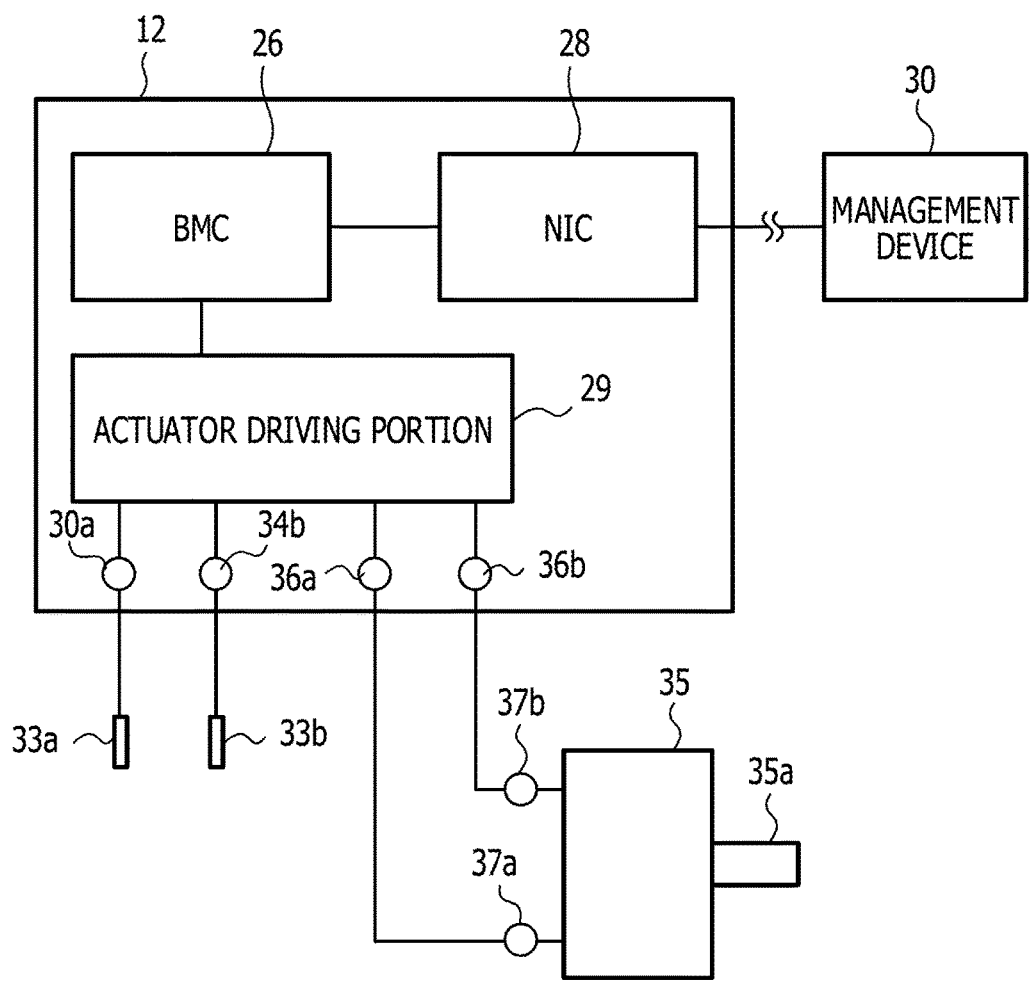
FIG. 6 illustrates an example of a configuration of the replacement work start detection mechanism.

For example, whether or not the replacement work of an abnormal server 12 is started may be detected by a contact provided on the front panel 12a and a contact provided on a support of the rack 11. FIG. 5 illustrates an example of a replacement work start detection mechanism. FIG. 6 illustrates an example of a configuration of the replacement work start detection mechanism. The replacement work start detection mechanism may be a mechanism that detects whether or not the replacement work of the server 12 is started.

As illustrated in FIG. 5, the server 12 is fixed to the support 11b of the rack 11 by a screw 32 disposed on an end portion of the front panel 12a. The screw 32 may be an example of a locking portion.

A contact 33a is provided on a rear side of the end portion of the front panel 12a and a contact 33b is provided on the support 11b. When the server 12 is fixed to the rack 11 (support 11b) by the screw 32, the contact 33a and the contact 33b come into contact with each other and are electrically connected to each other. When the screw 32 is loosened and the server 12 is taken out from the rack 11, the contact 33a and the contact 33b are electrically separated from each other while being separated from each other.

As illustrated in FIG. 6, the contacts 33a and 33b are connected to terminals 34a and 34b of the actuator driving portion 29. The BMC 26 detects presence or absence of electrical connection between the contact 33a and the contact 33b via the actuator driving portion 29 and notifies the management device 30 of the result via the NIC 28. The management device 30 determines whether or not the replacement work of the abnormal server 12 is started based on the information indicating presence or absence of electrical connection between the contact 33a and the contact 33b.

The replacement work start detection mechanism is not limited to the configuration described above and may be a configuration that detects that the worker is started the replacement work of the server.

For example, a locking mechanism may be provided to suppress removal of the server while migration from an abnormal server to a redundant server is performed.

As illustrated in FIG. 6, the actuator driving portion 29 has terminals 36a and 36b and these terminals 36a and 36b are connected to terminals 37a and 37b of the actuator 35. According to a signal (command) sent from the management device 30 via the NIC 28, the BMC 26 turns on and off electric power supplied from the terminals 36a and 36b to the actuator driving portion 29.

Figure 7A:
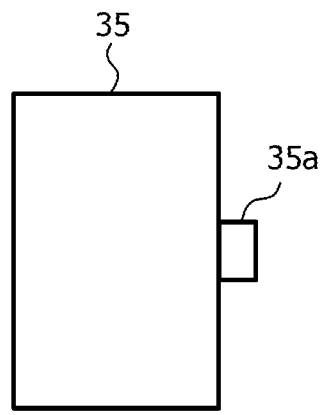
FIG. 7A and FIG. 7B illustrate an example of an operation of an actuator.
Figure 7B:
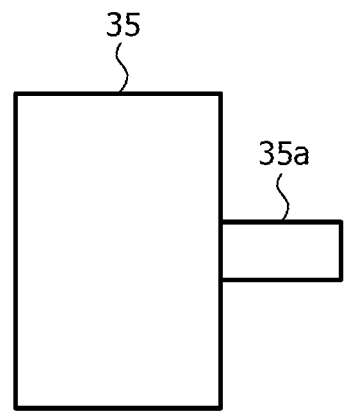

FIG. 7A and FIG. 7B illustrate an example of an operation of the actuator. The actuator 35 includes a coil, a spring, and a movable shaft (plunger) 35a. When electric power is supplied from the actuator driving portion 29 to the actuator 35, the movable shaft 35a is accommodated in a main body of the actuator 35 by a magnetic force of the coil as illustrated in FIG. 7A. When electric power supply from the actuator driving portion 29 to the actuator 35 is stopped, the movable shaft 35a jumps out in a shaft direction of the movable shaft 35a by a biasing force of the spring as illustrated in FIG. 7B.

Figure 8:
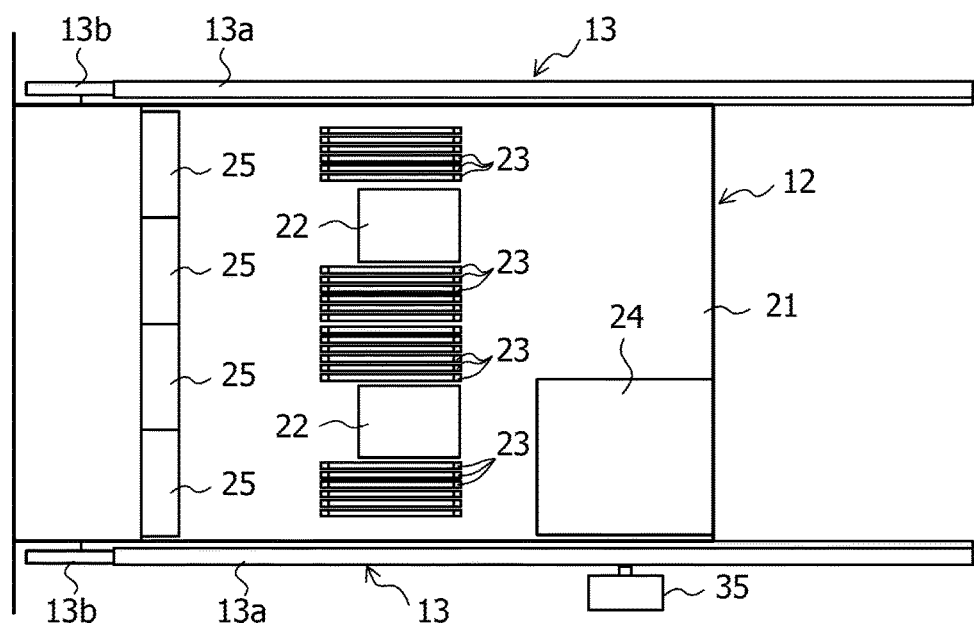
FIG. 8 illustrates an example of a positional relationship between the slide rails and the actuator.
Figure 9A:
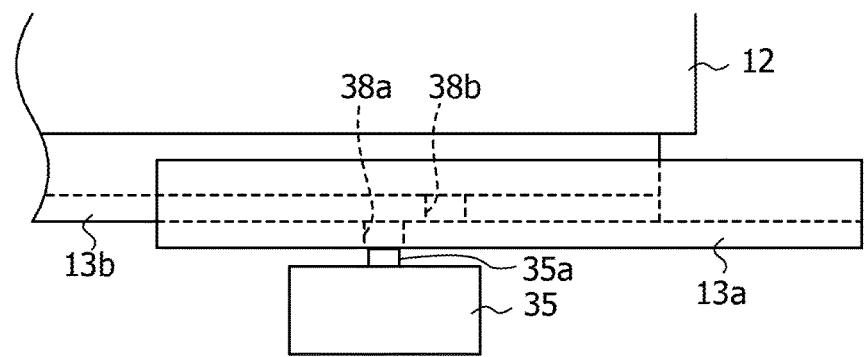
FIG. 9A and FIG. 9B illustrate an example of the positional relationship between the slide rail and the actuator.
Figure 9B:
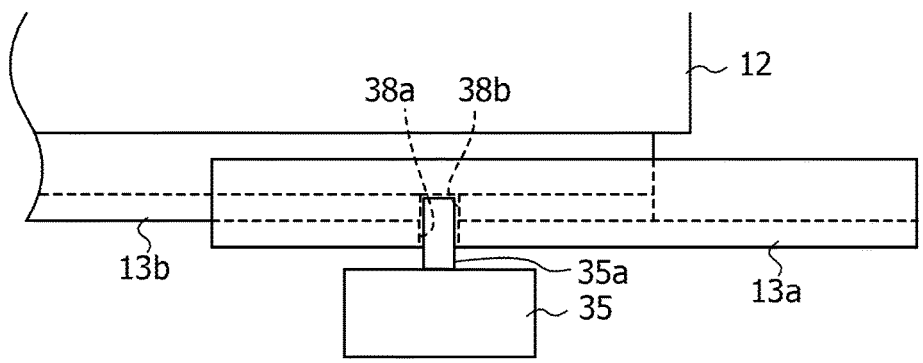

FIG. 8, FIG. 9A and FIG. 9B illustrate an example of a positional relationship between the slide rail and the actuator. FIG. 8 is a view illustrating the server 12 viewed from above and FIG. 9A and FIG. 9B are views illustrating the server 12 viewed from the side.

As illustrated in FIG. 8, the actuator 35 is disposed on a side of one of the pair of slide rails 13. As illustrated in FIG. 9A, holes 38a and 38b are provided at predetermined positions on the outer rail 13a and the inner rail 13b of the slide rail 13, respectively. The actuator 35 is disposed at a position where the movable shaft 35a matches the hole 38a of the outer rail 13a.

When the server 12 is accommodated in the rack 11, for example, when the server 12 is fixed to the support 11b of the rack 11 by the screw 32 (see FIG. 5) and the contact 33*a* and the contact 33*b* are in contact with each other, electric power is supplied from the actuator driving portion 29 to the actuator 35. Therefore, the movable shaft 35*a* of the actuator 35 is accommodated in the main body of the actuator 35. At this time, the hole 38*a* of the outer rail 13*a* and the hole 38*b* of the inner rail 13*b* are separated from each other, for example, by about 1 cm (see FIG. 9A).

When a worker loosens the screw 32 and takes out the server 12 slightly (about several millimeters) from the rack 11, the contact 33*a* and the contact 33*b* are separated from each other (see FIG. 5), and thus electrical connection between the contacts 33*a* and 33*b* is blocked. When the BMC 26 detects that the electrical connection between the contact 33*a* and the contact 33*b* is blocked, the BMC 26 stops electric power supply to the actuator 35 via the actuator driving portion 29.

Therefore, the movable shaft 35*a* of the actuator 35 jumps out of the main body of the actuator 35 by the biasing force of the spring and enters into the hole 38*a* of the outer rail 13*a*. Since the hole 38*a* of the outer rail 13*a* and the hole 38*b* of the inner rail 13*b* are out of alignment, a tip of the movable shaft 35*a* is elastically in contact with the wall surface of the inner rail 13*b*.

Thereafter, when the worker further takes out the server 12 from the rack 11 by about several millimeters, the hole 38*a* of the outer rail 13*a* and the hole 38*b* of the inner rail 13*b* overlap each other and the movable shaft 35*a* enters the hole 38*b* (see FIG. 9B). Therefore, the inner rail 13*b* is fixed (locked) to the outer rail 13*a*, and the server 12 is not taken out any more.

A structure of the locking mechanism is not limited to the structure described above and any structure may be used as long as the server may not be detached while migration is performed.

Figure 10:
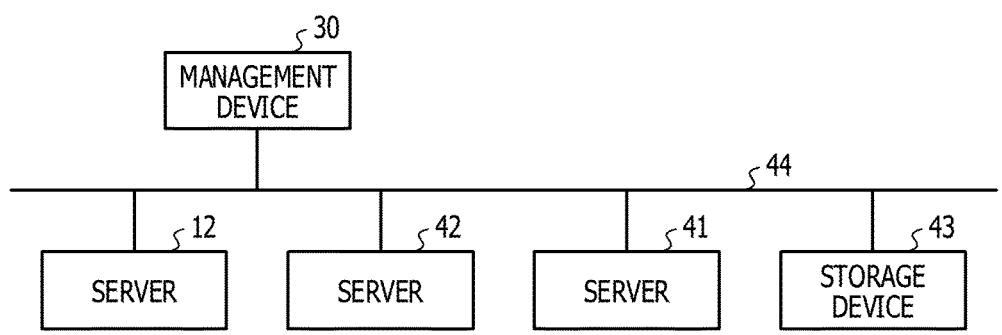
FIG. 10 illustrates an example of an information processing apparatus.

FIG. 10 illustrates an example of an information processing apparatus.

In FIG. 10, the server 12 in which abnormality is occurred is indicated by reference numeral 41. Reference numeral 42 denotes a redundant server which is a migration destination of the program, the data, or the OS of the server 41 in which the abnormality is occurred. Reference numeral 43 denotes a storage device, and a large number of files are stored in the storage device 43.

As illustrated in FIG. 10, the server 12 (including server 41), the redundant server 42, the storage device 43, and the management device 30 are connected via a LAN cable 44.

Figure 11:
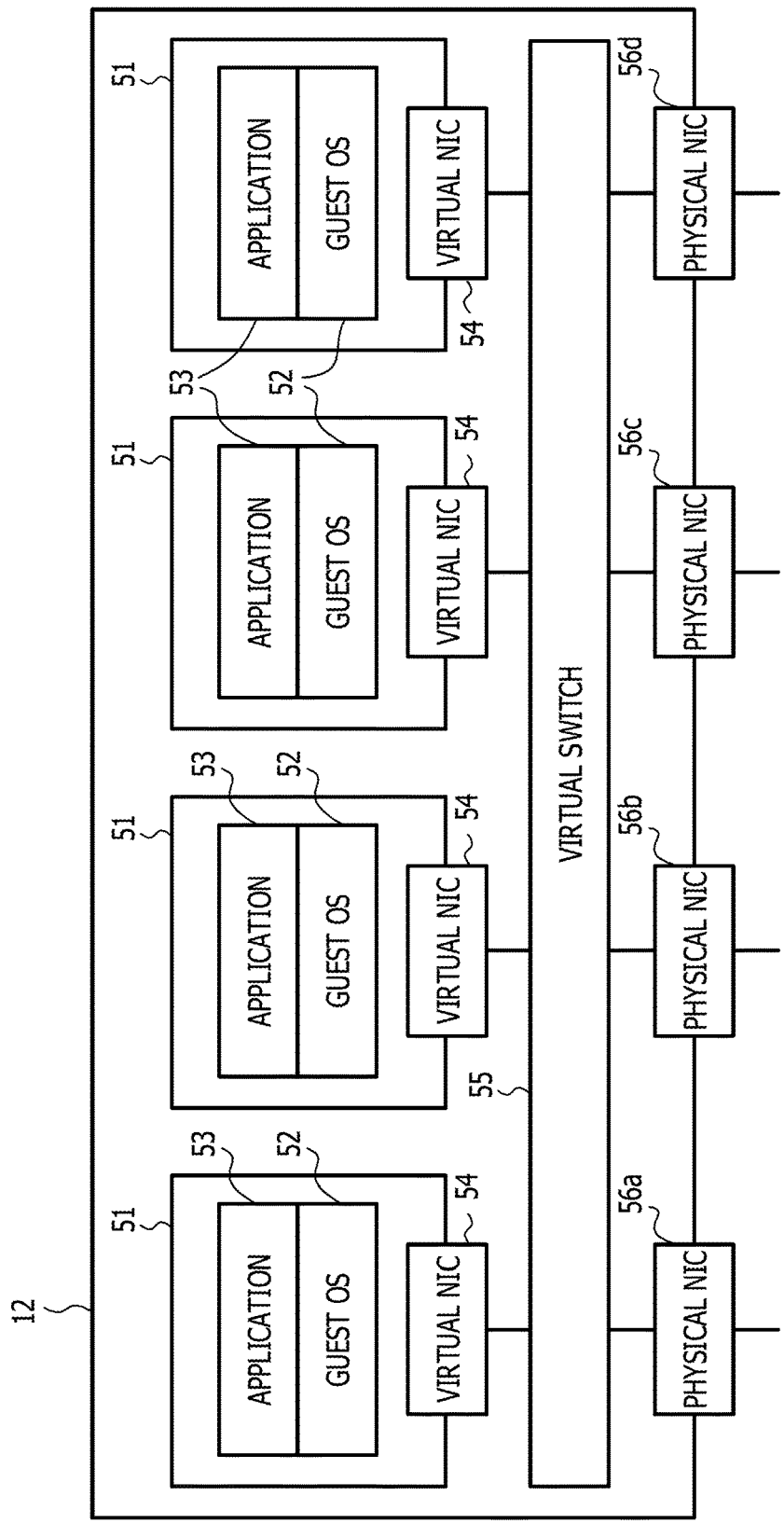
FIG. 11 illustrates an example of a configuration of the server.

FIG. 11 illustrates an example of the configuration of the server.

The server 12 (including server 41) has a plurality of virtual machines 51 realized by the CPU 22, the memory 23, and virtualization software. A guest OS 52 and software (application) 53 operating on the guest OS 52 are mounted on each of the virtual machines 51. Each virtual machine 51 has a virtual NIC 54, and the virtual NICs 54 are connected to physical NICs 56*a* to 56*d* via a virtual switch 55.

For example, the physical NIC 56*a* is used for communication between the virtual machine 51 and a client, and, for example, the physical NIC 56*b* is used, when the virtual machine 51 is moved to another server. For example, the physical NIC 56*c* is used for communication with the storage device 43 and, for example, the physical NIC 56*d* is used for communication with the management device 30.

Figure 12:
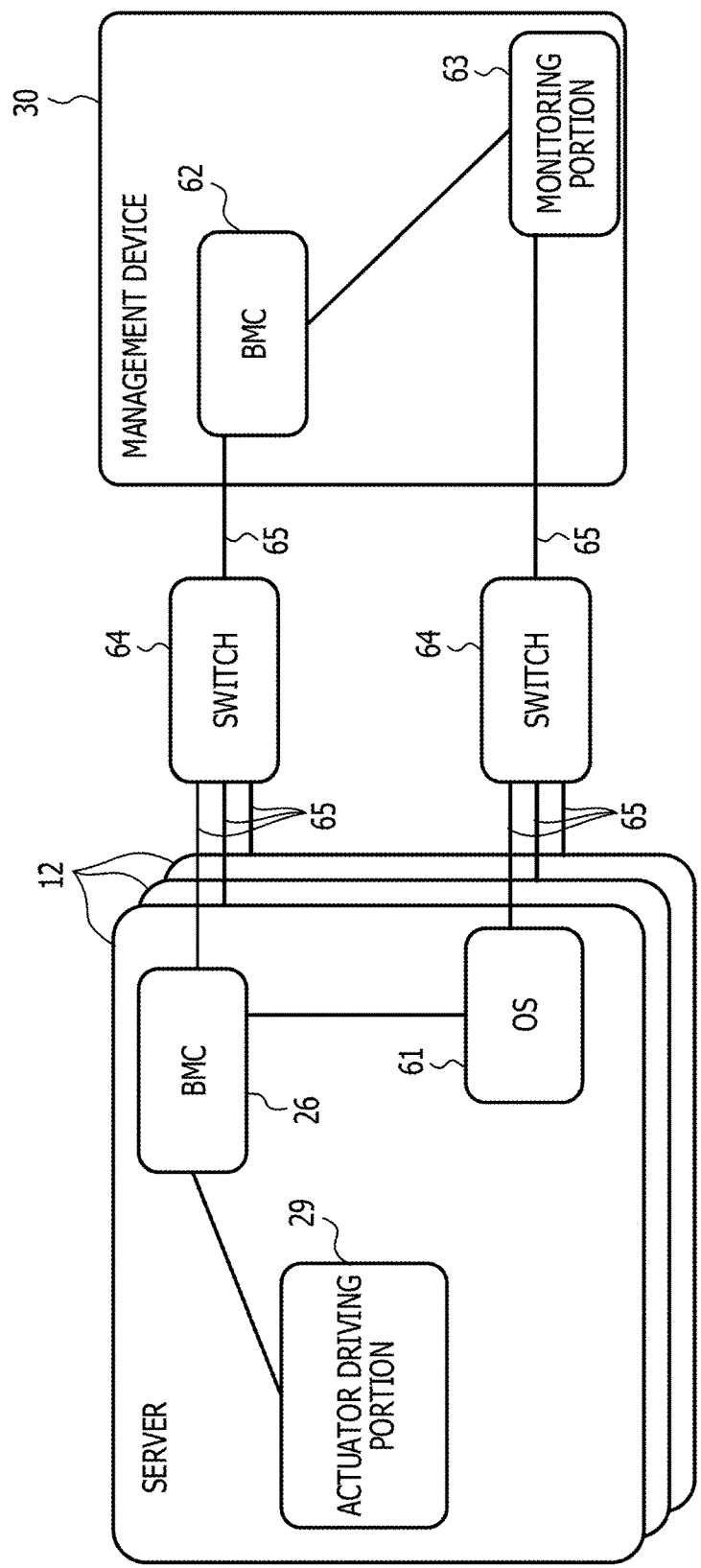
FIG. 12 illustrates an example of a signal path between the server and a management device.

FIG. 12 illustrates an example of a signal path between the server and a management device. In FIG. 12, a signal path between the server 12 or the server 41 and the management device 30 is illustrated.

As illustrated in FIG. 12, the management device 30 is also provided with a BMC 62 similarly to the server 12. The management device 30 has a monitoring portion 63 realized by dedicated software (software for data center management).

The BMC 26 of the server 12 communicates with the BMC 62 of the management device 30 via a LAN cable 65 and a switch (network switch) 64. An OS 61 of the server 12 communicates with the monitoring portion 63 of the management device 30 via the LAN cable 65 and the switch (network switch) 64.

The management device 30 performs communication with the server 12 via the OS 61 when the OS 61 of the server 12 is operating normally. The management device 30 performs communication with the BMC 26 of the server 12 via the BMC 62 when the OS 61 of the server 12 is down.

FIG. 13 illustrates an example of an operation of the management device. The operation illustrated in FIG. 13 may correspond to the method for controlling an information processing apparatus.

In operation S11, the management device 30 monitors the state of each server 12 (including server 41). For example, the management device 30 acquires information indicating a state of the status lamp from each server 12.

The process proceeds to operation S12 and the management device 30 determines whether or not there is an abnormal server 12 based on the information acquired from each server 12. In a case where there is no abnormality in all the servers 12 (in a case of NO), the process returns to the operation S11.

In a case where the management device 30 determines in operation S12 that there is an abnormal server (in a case of YES), the process proceeds to operation S13.

In operation S13, the management device 30 monitors whether or not the replacement work of the abnormal server 12 is started.

As described above, in a case where there is abnormality in the server 12, the status lamp of the front panel 12*a* of the server 12 is turned on. Therefore, a worker may easily specify the abnormal server 12. Hereinafter, the abnormal server 12 is described as a server 41. The worker specifies the abnormal server 41 and starts replacement work of the server.

As described above, the server 41 is provided with the replacement work start detection mechanism illustrated in FIG. 5 and the locking mechanism illustrated in FIGS. 8, 9A, and 9B. When a worker loosens the screw 32 of the front panel 12*a* of the server 41 to take out the server 41 by about several millimeters, electrical connection between the contact 33*a* and the contact 33*b* is blocked, and the actuator 35 is driven. Therefore, the server 41 is fixed (locked) to the rack 11.

Information indicating that the electrical connection between the contact 33*a* and the contact 33*b* is blocked is transmitted from the server 41 to the management device 30. Based on the information, the management device 30 determines that the replacement work of the server 41 is started and the process proceeds to operation S14.

In operation S14, the management device 30 executes dedicated software, such as vMotion (trademark) or the like and starts migration from the server 41 to the redundant server 42.

In operation S15, the management device 30 determines whether or not the migration is ended and waits until the migration is completed. In operation S15, when the management device 30 determines that the migration is ended (in a case of YES), the process proceeds to operation S16.

In operation S16, the management device 30 releases the locking mechanism. For example, the management device 30 sends a predetermined signal (command) to the BMC 26 of the server 41. When the signal is received, the BMC 26 supplies electric power to the actuator 35 via the actuator driving portion 29. Therefore, the locking is released and the server 41 is taken out from the rack 11. The management device 30 turns off the power supply of the server 41 via the BMC 26.

The process proceeds to operation S17, and the management device 30 waits until the replacement work of the server is ended by the worker.

After confirming that the power supply of the server 41 is turned off, the worker performs the work to replace the server 41 with the new server 12. For example, the worker takes out the server 41 from the rack 11, detaches the electric wire cable, the communication cable, and the like and further removes the server 41 from the slide rails 13.

The worker attaches the new server 12 to the slide rails 13, and attaches a power cable, the communication cable, and the like, and then accommodates the new server 12 in the rack 11.

When the new server 12 is accommodated in the rack 11, the contact 33a of the server 12 and the contact 33b (see FIG. 5) on the support 11b side of the rack 11 come into contact with each other and the contacts 33a and 33b are electrically connected to each other. This information is transmitted to the management device 30 via the BMC 26 of the new server 12 after the replacement.

The management device 30 determines that the server replacement work is ended by the worker based on the information transmitted from the new server 12 and the process proceeds to operation S18.

For example, it may be determined that the server replacement work is ended by the worker by detecting that the contact 33a and the contact 33b are electrically connected to each other. For example, it may be determined that the server replacement work is ended by the worker by detecting that the power supply cable and the communication cable are connected to the new server 12 and the power supply is turned on.

In operation S17, when the management device 30 determines that the replacement work of the server is ended by the worker, the process proceeds to operation S18. In operation S18, the management device 30 installs a hypervisor (software for realizing virtual machine) in the new server 12. The process proceeds to operation S19, and the management device 30 performs migration from the redundant server 42 to the new server 12.

In this way, the replacement work of the server is completed.

As described above, the management device 30 monitors presence or absence of abnormal servers based on the information sent from the server 12 (including server 41). In a case where it is determined that there is an abnormal server, the management device 30 detects whether or not the server replacement work is started by the worker using the server replacement work start detection mechanism. When determining that the replacement work is started by the worker, the management device 30 executes migration from the abnormal server 41 to the redundant server 42 and executes migration from the redundant server 42 to a new server 12 after the replacement.

It is sufficient that the worker slightly takes out the abnormal server 41 from the rack 11, waits until the migration is completed, then attaches the new server 12 to the slide rails 13 and accommodates the new server 12 in the rack 11, and thus the worker may not have any special technique. Therefore, the time and labor cost for server replacement work may be significantly reduced.

For example, the screw 32 (see FIG. 5) may be used as the locking portion for fixing (locking) the server 12 to the rack 11, and the server 12 may be fixed to the rack 11 by a lever instead of the screw 32. For example, a quick lever may be used as the locking portion.

Figure 14A:
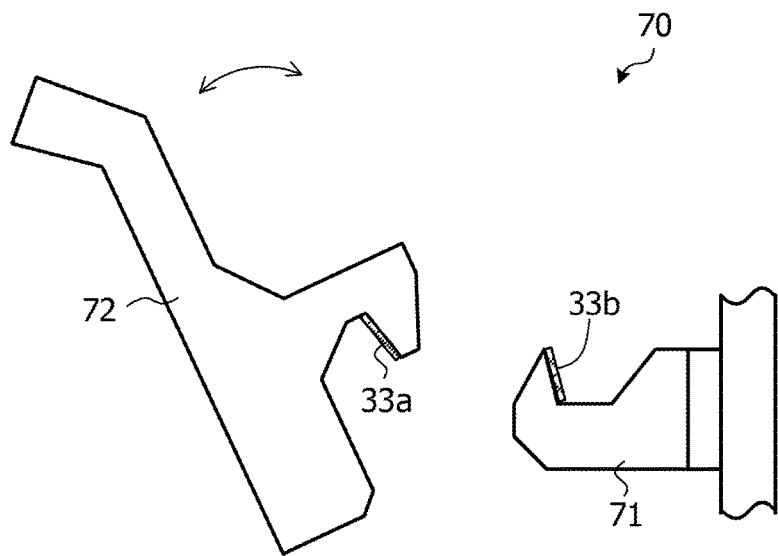
FIG. 14A and FIG. 14B illustrate an example of a quick lever.
Figure 14B:
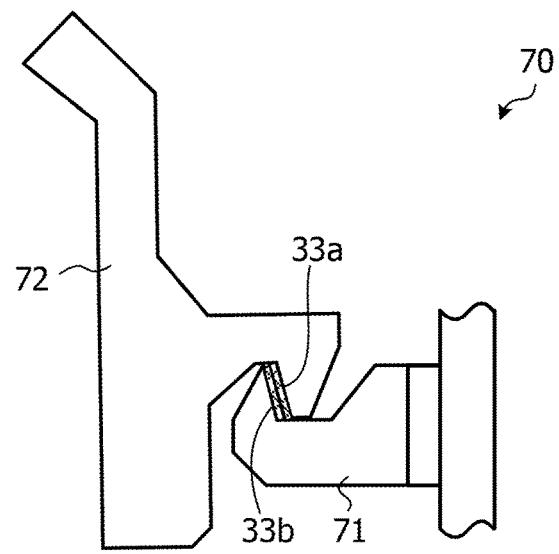

FIG. 14A and FIG. 14B illustrate an example of a quick lever.

As illustrated in FIG. 14A, the quick lever 70 includes a hook 71 which is provided on the support 11b of the rack 11 and a lever 72 which is provided on the front panel 12a of the server 12. As illustrated in FIG. 14B, by fitting the hook 71 and the lever 72, the server 12 is simply fixed to the rack 11. In this case, the same operation as described above may be performed by making the surface of the hook 71 and the surface of the lever 72 which are brought into contact with each other at the time of fixing conductive and setting the surface of the hook 71 and the surface of the lever 72 as the contacts 33a and 33b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a casing which includes a side plate on each of left and right sides; and
a processing apparatus to be mounted in the casing,
the processing apparatus includes:
  a board on which an arithmetic processing device and a storage device are mounted;
  a rail which is provided on each of the left and right sides of the board and extends in the horizontal direction to make the board slidable;
  a locking portion which locks the board to the casing;
  a detection portion which detects that the board is taken out first when the board is taken out from the casing by that locking by the locking portion is released and the board slides against the rails; and
  a locking mechanism provided so as to be separated physically from the locking portion and configured to lock the board to the casing when the board is further taken out from the casing after the board is taken out first,
the processing apparatus migrates a virtual machine which operates by using the arithmetic processing device and the storage device to another processing apparatus while the board is locked to the casing by the locking mechanism.

2. The information processing apparatus according to claim 1, wherein the locking portion locks the processing apparatus to the casing using a screw or a lever.

3. The information processing apparatus according to claim 1, wherein the detection portion detects whether or not the board is taken out based on contact or non-contact between a first contact provided in the processing apparatus and a second contact provided in the casing.

4. The information processing apparatus according to claim 1, wherein the locking mechanism includes a movable shaft which enters an hole provided in the rail when the board is further taken out from the casing.

* * * * *